Figure 1:
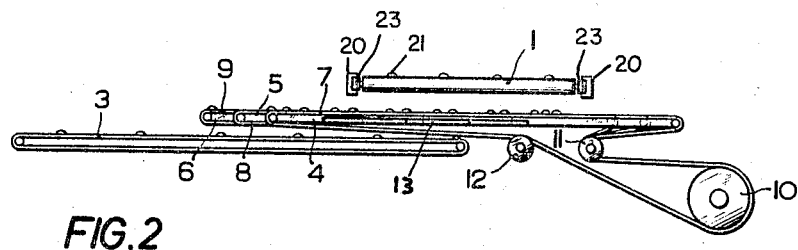

INVENTOR
HANS-JÜRGEN KIESSER

ATTORNEYS

June 13, 1967 HANS-JÜRGEN KIESSER 3,324,987
DEVICE FOR TRANSFERRING DISCRETE PIECES OF MATERIAL
FROM A FEED CONVEYOR TO A TRANSPORT CONVEYOR
Filed Jan. 19, 1965 3 Sheets-Sheet 2
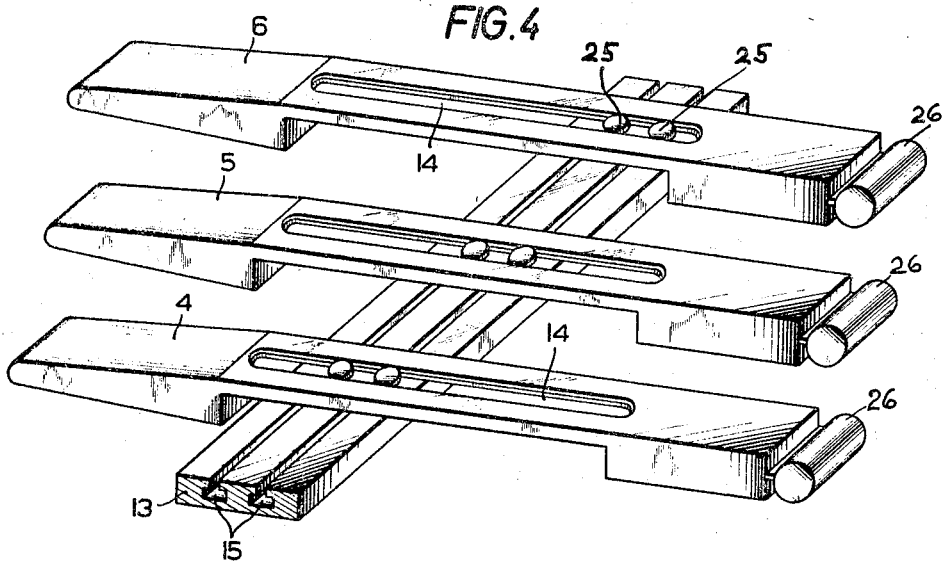
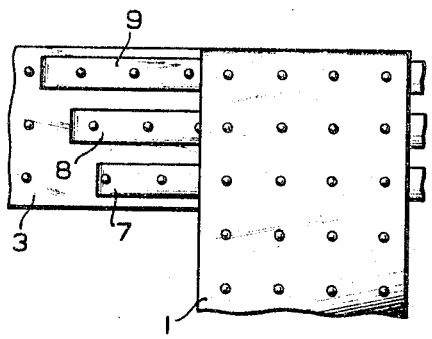
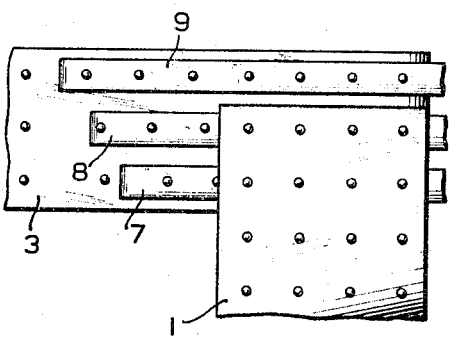
INVENTOR
HANS-JÜRGEN KIESSER

INVENTOR
HANS-JÜRGEN KIESSER
ATTORNEYS

3,324,987
DEVICE FOR TRANSFERRING DISCRETE PIECES OF MATERIAL FROM A FEED CONVEYOR TO A TRANSPORT CONVEYOR

Hans-Jürgen Kiesser, Stuttgart-Weilimdorf, Giebel, Germany, assignor to Werner & Pfleiderer, Stuttgart-Feuerbach, Germany, a German company
Filed Jan. 19, 1965, Ser. No. 426,561
Claims priority, application Germany, July 18, 1964, W 37,190
8 Claims. (Cl. 198—20)

The present invention relates to a device for transferring discrete pieces of material, particularly pieces of dough, from a feed conveyor to a transport conveyor, the pieces to be transferred being brought to a transfer station on the feed conveyor and removed therefrom by means of a discharge device associated with the feed conveyor.

There are known devices for loading trays or other supports supporting pieces of material such as dough to be worked or baked, in which devices the pieces are first moved from a feed conveyor to a transfer device comprising a plurality of carriers mounted in a desired pattern and each including two hingedly joined shells. After all the carriers are filled and moved to the desired positions, such as positions above the transport conveyor, they are abruptly and simultaneously opened. Theoretically all the pieces will fall out simultaneously, but in practice the adhesion of some of the pieces to the walls of the shells will be different from that of other pieces, and as a result, the pieces will not be deposited upon the transport conveyor in the desired pattern. Attempts have been made to eliminate such sticking of some of the pieces by providing lengthwise movable pins between the shells of the carriers. These pins are oriented to point accurately at the correct positions for the pieces on the transport conveyor, and when downwardly moved, penetrate into the pieces to guide the same into the correct positions. The disadvantage of devices of this kind is that they require a multitude of moving components and hence are expensive and not very reliable. Furthermore, a specially designed transfer device must be provided for each shape of the pieces and for different patterns in which the pieces are to be deposited. Such devices are also limited to transferring the pieces in continuous rows, and they require an intermittent drive, which further increases the costs of such devices.

It is further known to provide a transfer device with a rotary drive substantially in the form of a roller and acting step by step. A feed conveyor feeds irregular rows of pieces to the roller while the latter is standing still. The roller collects the pieces and orients the same in rows for deposition on a transport conveyor. Transfer devices of this kind are suitable only for round or elongated pieces of material. The roller of the device when turning deposits the oriented pieces row by row upon the transport conveyor. Devices using such intermittently driven rollers are comparatively expensive, and they can deposit the dough pieces only in continuous rows. Furthermore, the roller can receive and orient dough pieces only if the same are disposed crosswise of the direction of movement of the feed conveyor, but not when they are disposed lengthwise of the conveyor.

It is an object of the invention to provide a novel and improved transfer device for transferring pieces of dough or other material from a feed conveyor to a transport conveyor, which device is capable of transferring pieces of different shapes and of depositing such pieces on the transport conveyor selectively, in continuous rows, in staggered rows, or in other patterns.

The aforementioned object, features and advantages of the invention and other objects, features and advantages which will be pointed out hereinafter are attained by providing a transfer device for transferring pieces of dough or other material from a feed conveyor to a transport conveyor angularly, preferably rectangularly, disposed with reference to the feed conveyor, which transfer device comprises two or more transfer conveyors interposed between the feed conveyor and the transport conveyor for depositing pieces upon the latter. The transfer conveyors are continuously driven at a speed different from that of the transport conveyor, but correlated with the speed thereof. With such transfer device, pieces of dough or other material of any shape or consistency and in different positions on the feed conveyor can be deposited on the transport conveyor in desired regular patterns by suitably selecting the speeds of the transport conveyor and the transfer conveyors and the locations of transfer of the pieces from the transfer conveyors to the transport conveyor. The transfer conveyors are preferably all driven at the same rate of speed, whereby a common drive means, such as a common pulley, may be used for all the transfer conveyors.

According to a particularly advantageous embodiment of the invention, transfer conveyors of equal length and guide bars, also of equal length, for guiding the forward run—that is, the piece-carrying run—of the transfer conveyors are provided. The guide bars are preferably lengthwise displaceable, whereby only one size of guide bars is required, and the transfer device can be set for different patterns of deposition of the pieces simply by adjusting the lengthwise positions of the guide bars in reference to one another. Such an arrangement greatly increases the economy of manufacture and operation of the device. The guide bars may also be crosswise displaceable to the direction of movement of the transfer conveyors to adapt the transfer conveyors to the transverse spacing of the rows of pieces on the feed conveyor and the width of the transport conveyor.

In the accompanying drawing a preferred embodiment of the invention is shown by way of illustration, and not by way of limitation.

Figure 2:
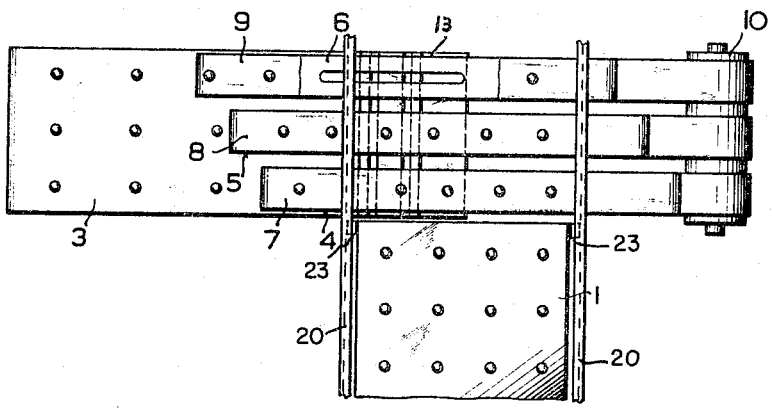
Figure 3:
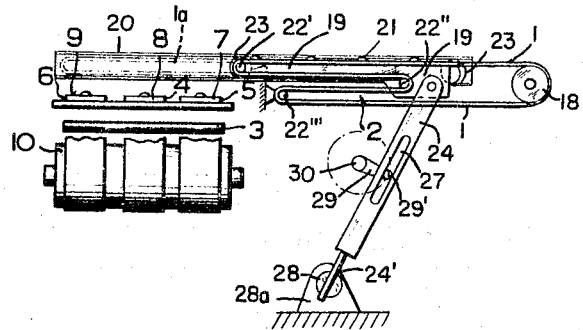
Figure 7:
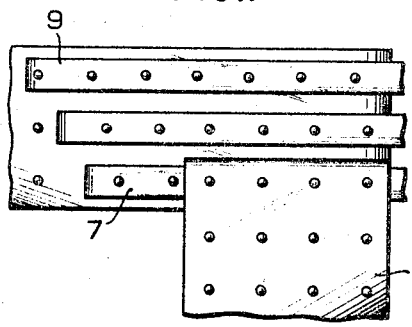

In the drawing:
FIG. 1 is a diagrammatic elevational view of a transfer device;
FIG. 2 is a plan view of FIG. 1;
FIG. 3 is a side view of FIG. 1;
FIG. 4 is a perspective view of guide bars for the transfer conveyors of the device;
FIGS. 5 through 8 show diagrammatically several operational stages of the transfer device; and
FIGS. 9 through 12 show diagrammatically the same operational stages, but for a different setting of the transfer conveyors of the device.

Referring first to FIGS. 1 through 4 in detail, the transfer device exemplified in these figures comprises a feed conveyor, such as a band conveyor 1, which in FIG. 1 should be visualized as traveling normal to the plane of the drawing. A discharge device 2 of conventional design is indicated in FIG. 2. The discharge device comprises a slide 19 which is movable back and forth in its own plane. The slide mounts at one end a roller 22′ and at the other end a roller 22″. Feed conveyor belt 1 which is in the form of an endless belt, is guided over these rollers and is further guided over stationary rollers 22‴ and 18. Roller 18 should be visualized as a drive roller driven by a conventional and not illustrated drive motor. Slide 13 further mounts on both sides rolls 23 which are guided in stationary guide tracks 20 as is clearly shown in FIGS. 1 and 2. These figures also show that the slide and with it conveyor belt 1 are mounted for movement normal to a transport conveyor 3.

To effect a reciprocating movement of discharge device 2 and conveyor belt 1 in reference to transport conveyor 3, a pivotal lever 24 is provided. This lever is linked with its upper end to slide 19 and terminates at its lower end in a lug 24' which is lengthwise slidable in a transverse bore of a pin 28 which, in turn, is pivotal in a stationary support 28a. Lever 28 is pivoted back and forth by means of a crank 29 mounted on a rotary shaft 30. Crank 29 mounts a crank pin 29' engaging a lengthwise slot 27 in lever 24. The movement performed by crank pin 29' is indicated by a dashed-dotted circle.

As is evident, an oscillation of lever 24 causes a reciprocating movement of the belt and slide assembly between the full line position and the dotted line position of FIG. 3. Roller 22' defines a discharge end of belt 1. This discharge end moves back and forth in reference to the width of transport conveyor 3 for a purpose which may be more fully explained hereinafter. As a result, the discharge device coacts with feed conveyor 1 in a conventional and well-known manner and causes the same to deposit batches of pieces of dough 21, row by row in three rows, upon transfer conveyors 7, 8 and 9, which all travel at the same speed and also at the same speed as the discharge device and the feed conveyor. The transfer conveyors are disposed lengthwise of the transport conveyor 3 and above the same. Depositing of the pieces starts when the loop formed by the conveyor belt about roller 22' is in the dotted-line position. As shown in FIG. 2, four pieces of dough are deposited first on transfer conveyor 9, then on transfer conveyor 8, and finally on transport conveyor 7 as the belt loop is gradually withdrawn into the full line position. The transfer conveyors should be visualized as being driven by suitable drive means which is indicated as a common pulley 10. Idlers 11 and 12, which also are common to all three transfer conveyors, serve to tension the same. Coarse adjustment of the transfer conveyors may be effected by the setting of idler 11, and a fine adjustment by guide bars 4, 5 and 6, as will be more fully described hereinafter. The guide bars, which are shown in detail in FIG. 4, serve to support and guide the forward run of the transfer conveyors; that is, the run of the conveyors which carries the pieces of dough to be transferred. Each of the guide bars has a lengthwise slot 14. The bars are supported on a common support strip 13 which is fixedly mounted crosswise of the guide bars. The bars are secured to strip 13 by locking pins 25, which extend through slots 14 and engage a lengthwise groove 15 in the strip 13. As is evident, pins 25 permit lengthwise adjustment of the bars in reference to each other by sliding the same in slot 14, and also transverse adjustment of the bars by sliding the pins in groove 15. To prevent angular turning of the guide bars in reference to strip 13, two pins 25 for each bar and two grooves 15 are preferably provided, as shown.

The lengthwise and crosswise adjustability of the three guide bars permits control of the patterns in which the pieces of dough are deposited on the transport conveyor 3, which travels at an angle in reference to the direction of travel of the feed conveyor, preferably at a right angle, as is shown in FIG. 2. The patterns in which the pieces of dough are deposited on conveyor 3 by falling off the transfer conveyors may be controlled in lengthwise direction and also as to transverse spacing, as will become more fully apparent from the subsequent description.

As is evident, lengthwise displacement of the guide bars also provides means for effecting a fine adjustment of the tension of the respective transfer conveyor bands. Each of the guide bars further serves to guide the respective conveyor band from its piece-carrying forward run to its return run, and for this purpose may be provided with a guide roller 26 at one end.

The operation of the device as hereinbefore described, is as follows:

As previously explained, the discharge device 2 diagrammatically shown in FIG. 3 deposits batches of pieces of dough carried by the feed conveyor 1 successively upon transfer conveyors 9, 8 and 7, in that order. The transfer conveyors are assumed to be in the staggered arrangement of FIG. 2 in reference to transport conveyor 3. The speed of the transport conveyor is assumed to be higher than that of the transfer conveyors. Accordingly, the pieces of dough first deposited on conveyor 9 remain longer on this conveyor than do those deposited on conveyor 8, and the pieces on conveyor 8 remain longer on the same than those deposited on conveyor 7. By suitably selecting the respective positions of the transfer conveyors, the successive depositions of the pieces upon these conveyors can be compensated for so that all three transfer conveyors will deposit the pieces on the transport conveyor 3 in transversely aligned rows, as is shown in FIG. 2.

Figure 8:
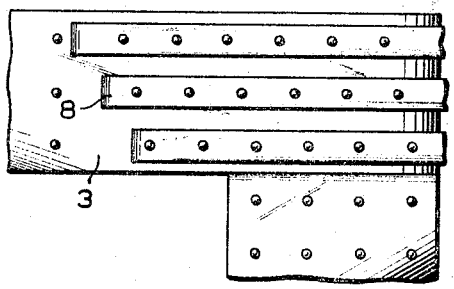
Figure 9:
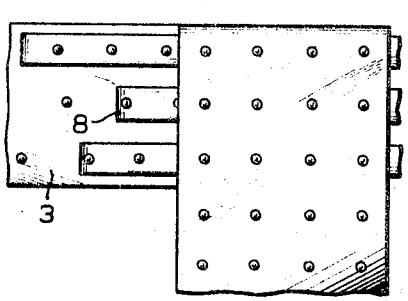
Figure 10:
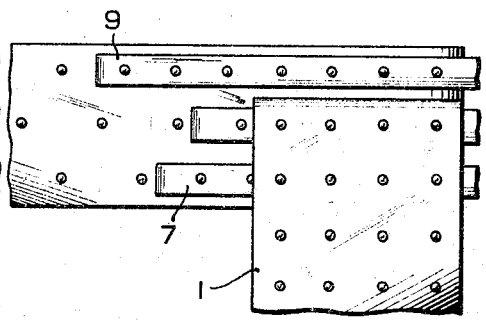
Figure 11:
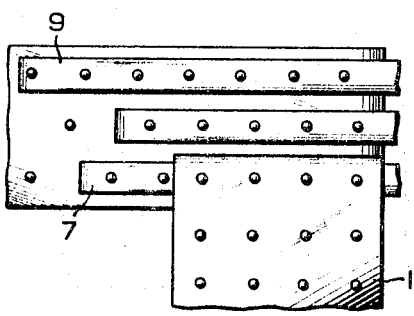
Figure 12:
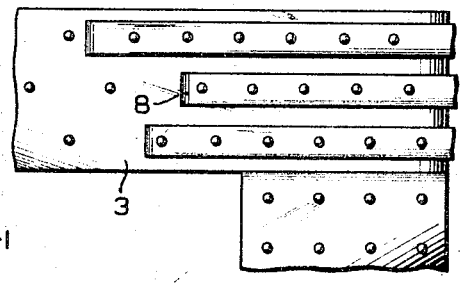

Turning now to FIGS. 5 through 8, these figures show the successive depositions of batches of pieces on transport conveyor 3. The three transfer conveyors are shown in the same staggered arrangement in which they are shown in FIG. 2. The discharge device 2 is omitted to simplify the illustration. More specifically, FIG 5 shows the deposition of pieces on conveyor 9, FIG. 6 the deposition of pieces on conveyor 8, FIG. 7 the deposition of pieces on conveyor 7; and FIG. 8 shows the respective end position of the feed conveyor in reference to the transfer conveyors and the transport conveyor. The figures also show that the pieces are deposited in straight lengthwise and transverse rows.

FIGS. 9 through 12 show the same operational stages, but the position of transfer conveyor 8 in reference to transfer conveyors 7 and 9 is changed, in that conveyor 8 is moved toward the right in reference to conveyors 7 and 9 by means of its guide bar 5, in the manner previously described. As a result, the pieces of dough are not deposited in the transverse rows shown in FIGS. 5 through 8; but the intermediate lengthwise row of pieces is staggered in reference to the two outer rows.

An analysis of FIGS. 5 through 12 makes it apparent that by adusting the lengthwise positions of the transfer conveyors in reference to each other, a great number of different patterns of pieces as deposited on the transport conveyor can be readily obtained. It is further apparent that the specific form, initial positions and consistency of the pieces of dough or other material have no bearing upon the functioning of the device, and also that it is unnecessary that the feed conveyor and the transport conveyor be disposed at the illustrated right angle in reference to each other, but that an acute or obtuse angle also may be provided.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A transfer device for transferring discrete substantially uniform pieces of material from a feed conveyor to a transport conveyor, said transfer device comprising, in combination, a feed conveyor having a discharge portion extending in one plane, a transport conveyor disposed at an angle substantially normal to the direction of movement of the feed conveyor and continuously driven in a plane below that of the feed conveyor and parallel to said plane, support means displaceably supporting said discharge portion in the plane thereof, reciprocating drive means coacting with said support means for reciprocating said discharge portion substantially across the width of the transport conveyor for discharging pieces of material conveyed on the feed conyeror in different positions in reference to the width of said transport conveyor, and several transfer conveyors extending, side by side, lengthwise of the transport conveyor and disposed intermediate the planes of the feed conveyor and the transport conveyor, each of said transfer conveyors having a discharge end located above the transport conveyor for depositing pieces discharged from the feed conveyor sequentially upon the transfer conveyors and from the transfer conveyors upon the transport conveyor, said transfer conveyors being driven at speeds different from the speed of the transport conveyor by a predetermined rate of speed.

2. A transfer device according to claim 1, wherein the speed of the transfer conveyors is less than that of the transport conveyor.

3. A transfer device according to claim 1, and comprising a common drive means for said transfer conveyors.

4. A transfer device according to claim 1, and comprising a guide bar for each of said transfer conveyors to support and guide a portion thereof carrying pieces to be transferred to the transport conveyor by falling off at the end of said portion in the direction of movement of the transfer conveyors.

5. A transfer device according to claim 4, wherein said transfer conveyors are of equal length and said guide bars are also of equal length.

6. A transfer device according to claim 4, wherein each of said guide bars extends lengthwise of the respective transfer conveyor and is lengthwise adustable in reference thereto to vary the position of said end in reference to the transport conveyor.

7. A transfer device according to claim 4, wherein each of said guide bars extends lengthwise of the respective transfer conveyor and is transversely adustable in reference thereto.

8. A transfer device according to claim 1, wherein each of said transfer conveyors comprises an endless conveyor band, said conveyor bands traveling in a substantially common plane generally parallel to the plane of the transport conveyor.

References Cited

UNITED STATES PATENTS

| | | | |
|---|---|---|---|
| 2,680,509 | 6/1954 | Kandra | 198—30 |
| 3,106,280 | 10/1963 | Baker | 198—30 |

EVON C. BLUNK, *Primary Examiner.*

RICHARD E. AEGERTER, SAMUEL F. COLEMAN,
*Examiners.*